United States Patent [19]

Jeschke

[11] Patent Number: 4,831,825

[45] Date of Patent: May 23, 1989

[54] DEVICE FOR FEEDING ENERGY TO A CYLINDER

[75] Inventor: Willi Jeschke, Heidelberg, Fed. Rep. of Germany

[73] Assignee: Heidelberger Druckmaschinen AG, Heidelberg, Fed. Rep. of Germany

[21] Appl. No.: 31,948

[22] Filed: Mar. 27, 1987

[30] Foreign Application Priority Data

Apr. 4, 1986 [DE] Fed. Rep. of Germany ....... 3611243

[51] Int. Cl.[4] ...................... F16D 31/02; F01C 21/00; F15D 13/04

[52] U.S. Cl. ...................................... 60/473; 91/444; 91/459; 417/319; 418/69; 418/199

[58] Field of Search .............. 418/69, 199; 417/426 E, 417/429, 223, 319; 91/444, 459; 60/473

[56] References Cited

U.S. PATENT DOCUMENTS

| | | | |
|---|---|---|---|
| 2,514,449 | 7/1950 | Klavon | 418/69 |
| 2,762,301 | 9/1956 | Cornell | 417/429 |
| 3,258,093 | 6/1966 | Ahlen | 418/199 |
| 3,643,433 | 2/1972 | Widmair | 417/426 |

FOREIGN PATENT DOCUMENTS

| | | | |
|---|---|---|---|
| 858777 | 4/1959 | United Kingdom | 418/199 |

*Primary Examiner*—William L. Freeh

*Attorney, Agent, or Firm*—Herbert L. Lerner; Laurence A. Greenberg

[57] ABSTRACT

A device for feeding energy to a cylinder rotationally mounted on a stationary machine part includes a hydraulic pump disposed in the cylinder, and a transmission device located between the stationary machine part and the hydraulic pump, the transmission device being engageable with the hydraulic pump at a drive side thereof for driving the pump.

6 Claims, 3 Drawing Sheets

DEVICE FOR FEEDING ENERGY TO A CYLINDER

The invention relates to a device for feeding energy to a cylinder which is rotationally mounted on a stationary machine part, such as in a printing machine, for example.

Correcting or adjusting elements of different types which are actuated by a stationary machine part are often arranged in or at rotating cylinders of printing machines. For this purpose, mechanical and electrical devices (e.g. planetary gears, cam gears or slip ring transmissions) have become known.

Moreover, devices have become known heretofore which employ hydraulic systems for varying the diameter of the cylinder casing in German Published Prosecuted Application 29 46 252 (DE 29 46 252 C2) and for performing switching and tensioning operations at a turning device in German Utility Patent 83 19 431 (DE 83 19 431 U1). In this regard, one or more hydraulic lines are extended through rotary ducts or pass-throughs from the stationary machine parts into the shifts of the cylinders. Occasionally, rotary ducts or pass-throughs are susceptible to failure or disruption and thus incur additional demands for maintenance of the machine are incurred. Furthermore, the cylinder trunnion or journal is not always freely accessible.

With the foregoing and other objects in view, there is provided, in accordance with the invention, a device for feeding energy to a cylinder rotationally mounted on a stationary machine part, comprising an hydraulic pump disposed in the cylinder, and transmission means located between the stationary machine part and the hydraulic pump, the transmission means being engageable with the hydraulic pump at a drive side thereof for driving the pump. The advantages of the device according to the invention are that no rotary ducts or pass-throughs for the hydraulic lines are necessary and that a compact hydraulic system arranged within the cylinder may be used.

In accordance with another feature of the invention, the transmission means comprise a cam mounted on the stationary machine part so as to be fixed against rotation and embracing a shaft which carries the cylinder.

In accordance with a further feature of the invention, a roller lever operatively engaging the cam is arranged on the drive side of the hydraulic pump. In this manner, a required oscillating motion is transmitted to a pump in a simple and suitable manner.

Different conventional pumps are suitable for use within the scope of the invention. In accordance with an added feature of the invention, the hydraulic pump has a drive shaft at the drive side thereof, and the roller lever is arranged on the drive side of the hydraulic pump, when the latter is of the type which is driven with a swinging or pivoting motion.

In accordance with an additional feature of the invention, the cam is mounted so as to be displaceable in axial direction of the cylinder. Contact between the cam and the roller lever is thereby controllable or changeable, so that the hydraulic pump can be switched off any time.

In accordance with another embodiment of the invention, the transmission means comprise a ring gear and a gear wheel, the ring gear being mounted on the stationary machine part so as to be fixed against rotation and concentrically embracing a shaft which carries the cylinder, the gear wheel being mounted on a drive shaft of the hydraulic pump. This construction is especially suitable for hydraulic pumps which are driven by rotary motion.

With the latter construction, it is also possible to switch off the hydraulic pump due to yet another feature of the invention, namely that the ring gear is mounted so as to be displaceable in axial direction of the cylinder. An especially simple device is obtained when, in accordance with yet a further feature of the invention, the hydraulic pump is a geared pump.

In accordance with yet an additional feature of the invention, the hydraulic pump forms part of an hydraulic system disposed in the cylinder, and the hydraulic system further comprises a pressure-regulating valve and at least one working cylinder.

In accordance with yet an added feature of the invention, there are provided electrical feed lines extending to the cylinder via slip rings or rotary transmitters.

In accordance with another feature of the invention, the hydraulic system further comprises electrically actuatable hydraulic adjusting elements. This construction enables hydraulic adjusting elements in the cylinder to be electrically actuated. Moreover, monitoring the pressure in the hydraulic system is possible when, in accordance with a concomitant feature of the invention, the hydraulic system includes a pressure-dependent electrical switch.

Other features which are considered as characteristic for the invention are set forth in the appended claims.

Although the invention is illustrated and described herein as embodied in a device for feeding energy to a cylinder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Like parts in the figures are identified by the same reference numerals.

Figure 1:
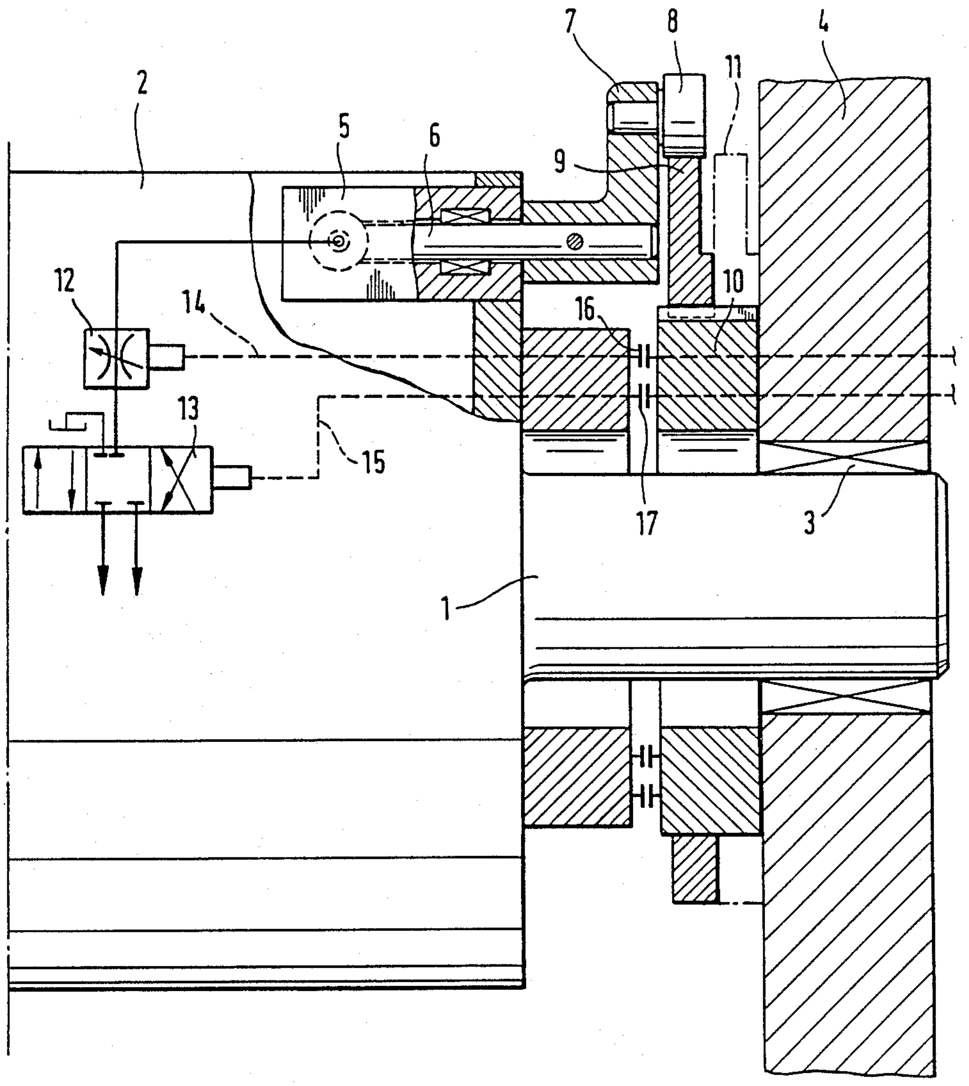
FIG. 1 is a diagrammatic longitudinal sectional view of a first embodiment of the device for feeding energy to a cylinder in accordance with the invention.

Referring now more specifically to FIG. 1 of the drawing, there is shown therein a shaft 1 of a cylinder 2 of a machine, such as a printing machine shown in part. The shaft is mounted in a stationary part 4 of the machine by means of a bearing 3. The bearing at the other end of the shaft 1 is not shown, because it is not necessary for describing or explaining the invention.

An hydraulic pump 5 driven by a swiveling motion of a drive shaft 6 therefor is provided in the cylinder 2. The drive shaft 6 carries a lever 7 provided with a roller 8. By means of a non-illustrated spring, the roller 8 is pressed in a conventional manner against a circumferential surface of an eccentric or cam 9, The cam 9 is mounted on a ring 10 so as to be fixed against rotation, the ring 10 being disposed concentric to the shaft 1.

The cam 9 is displaceable, however, from the position thereof shown in FIG. 1, in which it is in engagement with the roller 8, into a position 11 thereof shown in phantom in FIG. 1. The transmission system thus formed by the cam 9 and the roller lever 7 is thereby able to be disengaged.

The hydraulic pump is part of an hydraulic system which is illustrated only diagrammatically and schematically in FIG. 1 and which comprises, among other elements, electrically actuated valves 12 and 13. Leads 14 and 15 which extend via electrical slip rings 16 and 17, respectively, from the stationary machine part 4 to the cylinder 2 are provided for actuating the valves 12 and 13.

Figure 2:
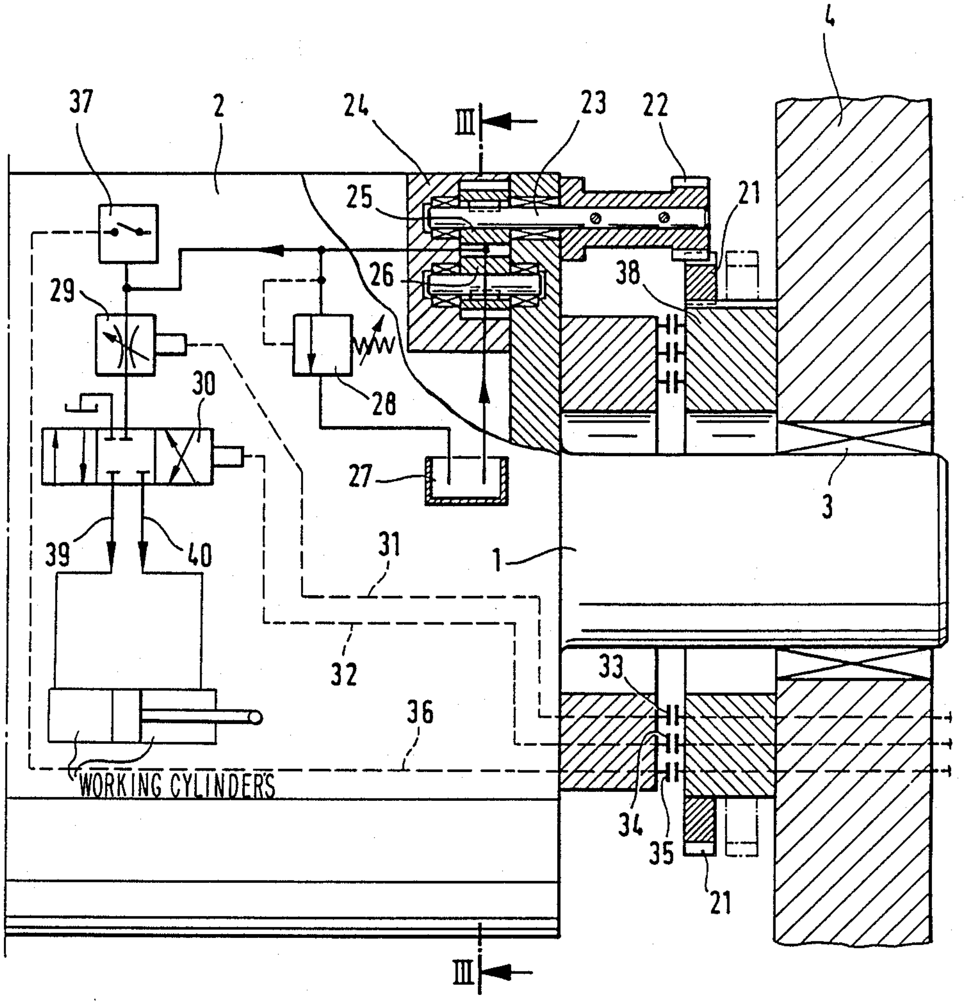
FIG. 2 is a diagrammatic longitudinal sectional view of another embodiment of FIG. 1.
Figure 3:
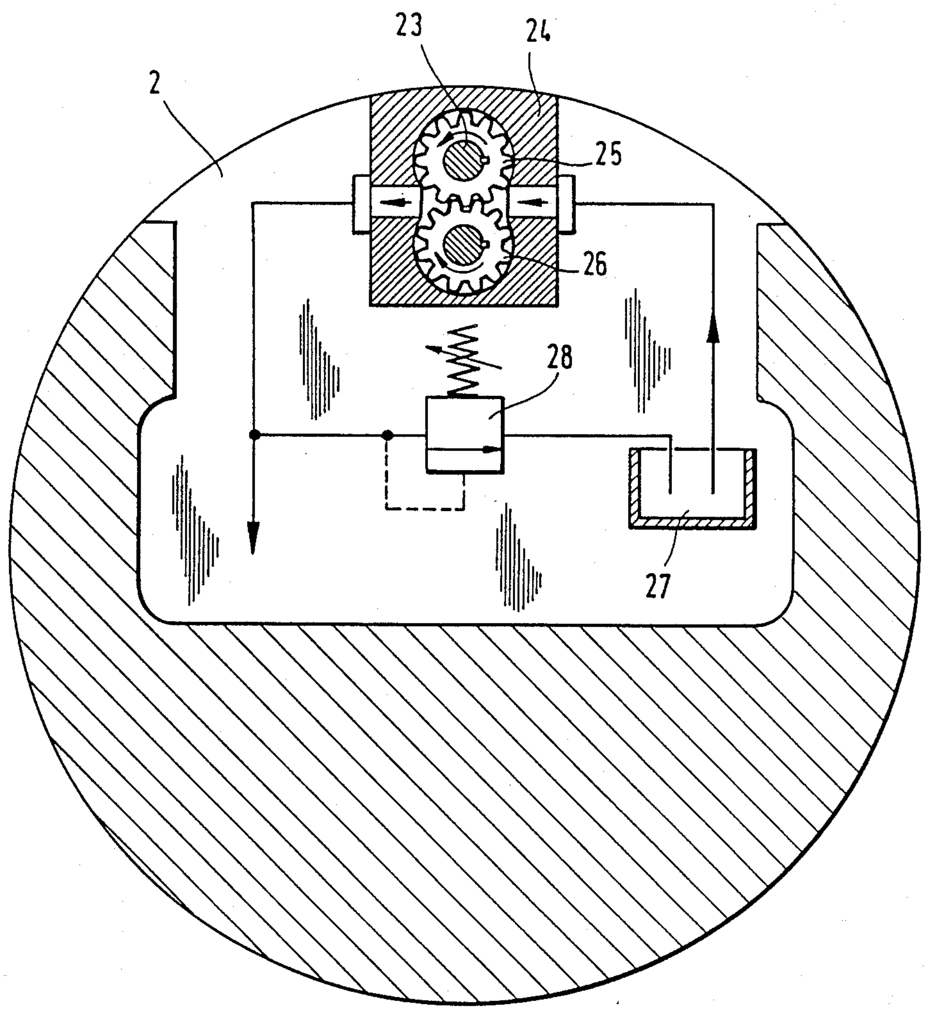
FIG. 3 is a cross-sectional view of FIG. 2 taken along the line III—III in the direction of the arrows.

The transmission system of the embodiment shown in FIGS. 2 and 3 differs from that of FIG. 1 in that it has a ring gear 21 and a gear wheel or pinion 22. The pinion 22 is mounted on a drive shaft 23 of a geared pump 24 which is provided with two gear wheels 25 and 26 in a conventional manner. In order to enable disengagement of the transmission system, the ring gear 21 is arranged so as to be displaceable on a ring 38 corresponding to the ring 10 of FIG. 1.

The hydraulic system, which is only diagrammatically and schematically illustrated, includes a reservoir 27, a pressure-regulating valve 28 and electrically actuatable valves 29 and 30 which can be actuated via lines 31 and 32, respectively, and slip rings 33 and 34, respectively. For the purpose of reporting how much pressure has been applied, a pressure-dependent switch 37 is provided which, via the lead 36 and the slip ring 35, is connected to appropriate display and control systems, respectively, which are attached to the stationary machine part 4. From the outputs 39 and 40 of the hydraulic adjusting or correcting elements 30, leads or connecting lines extend to non-illustrated working cylinders.

The foregoing is a description corresponding in substance to German Application P 36 11 243.7, dated Apr. 4, 1986, the International priority of which is being claimed for the instant application, and which is hereby made part of this application. Any material discrepancies between the foregoing specification and the aforementioned corresponding German application are to be resolved in favor of the latter.

I claim:

1. Device for feeding energy to a cylinder rotationally mounted on a stationary machine part, comprising an hydraulic pump disposed in the cylinder, and transmission means located between the stationary machine part and said hydraulic pump, said transmission means being engageable with said hydraulic pump at a drive side thereof for driving said pump, said transmission means comprising a ring gear and a gear wheel, said ring gear being mounted on the stationary machine part so as to be fixed against rotation and concentrically embracing a shaft which carries the cylinder, said gear wheel being mounted on a drive shaft of said hydraulic pump; said hydraulic pump forming part of an hydraulic system disposed in the cylinder, said hydraulic system further comprising a pressure-regulating valve and at least one working cylinder, and including electrical feed lines extending the valve in to the cylinder via slip rings for controlling the valve.

2. Device according to claim 1, wherein said ring gear is mounted so as to be displaceable in axial direction of the cylinder.

3. Device according to claim 1, wherein said hydraulic pump is a geared pump.

4. Device according to claim 1, including electrical feed lines extending to the cylinder via rotary transmitters.

5. Device according to claim 1, wherein said hydraulic system further comprises electrically actuatable hydraulic adjusting elements.

6. Device according to claim 1, wherein said hydraulic system includes a pressure-dependent electrical switch.

* * * * *